United States Patent [19]

Reed et al.

[11] Patent Number: 5,566,234
[45] Date of Patent: Oct. 15, 1996

[54] METHOD FOR CONTROLLING FRAUDULENT TELEPHONE CALLS

[75] Inventors: Elaine E. Reed, Vienna, Va.; Cynthia A. Edge, Cedar Rapids, Iowa

[73] Assignee: MCI Communications Corporation, Washington, D.C.

[21] Appl. No.: 530,067

[22] Filed: Sep. 19, 1995

Related U.S. Application Data

[63] Continuation of Ser. No. 106,990, Aug. 16, 1993.

[51] Int. Cl.⁶ ................................................. H04M 1/66
[52] U.S. Cl. ........................... 379/188; 379/145; 379/91
[58] Field of Search ............................ 379/88, 89, 93, 379/95, 144, 145, 189, 182, 196, 197, 62

[56] References Cited

U.S. PATENT DOCUMENTS

| | | | |
|---|---|---|---|
| 4,893,330 | 1/1990 | Franco | 379/91 |
| 5,109,408 | 4/1992 | Greenspan et al. | 379/197 |
| 5,127,043 | 1/1992 | Hunt et al. | 379/88 |
| 5,131,027 | 7/1992 | Hird et al. | 379/112 |
| 5,163,086 | 11/1992 | Ahearn et al. | 379/91 |
| 5,335,265 | 8/1994 | Cooper et al. | 379/59 |
| 5,345,595 | 9/1994 | Johnson et al. | 379/60 X |
| 5,357,564 | 10/1994 | Gupta et al. | 379/188 |

Primary Examiner—Stephen Chin
Assistant Examiner—Kevin Kim

[57] ABSTRACT

A method for controlling telephone fraud of the type whereby a caller places calls or accesses services via unauthorized use of a credit card number or other authorization number. For such control, an initial call using the number and meeting a certain primary criterion (such as placement to a geographical area known to receive numerous fraudulent calls) is intercepted and it is determined whether or not that call is an authentic use of the number. If authentic, other calls are then allowed without interception, even though they may meet the primary criterion, unless or until a secondary criterion is met. Meeting the secondary criterion (which may relate to calling patterns indicative of fraud) also causes a call to be intercepted and a determination made as to whether the use is authentic. For interception due to either criterion, if the call is determined to be inauthentic, the authorization number may be removed from service. The result of the control method is a reduction in fraudulent calls, but with minimal discrimination against authentic uses of a calling authorization number.

23 Claims, 7 Drawing Sheets

METHOD FOR CONTROLLING FRAUDULENT TELEPHONE CALLS

This application is a continuation of U.S. patent application Ser. No. 08/106,990, filed Aug. 16, 1993.

This invention relates generally to the field of telephony, but more particularly it relates to methods for controlling, or preventing, the fraudulent placement and billing of telephone calls.

BACKGROUND OF THE INVENTION

There is a continuous trend in telephony to devise ways to make a customer's telephone service more accessible. With current telephone systems, for example, a subscriber is no longer bound to obtain services only at a fixed location, and in many cases the subscriber can access long-distance and certain specialized calling features from virtually any telephone.

Such access is usually dependent on the use of an authorization code, generally in the guise of a credit card number, although that is not necessarily the case, and other authorization and billing numbers may be employed. Access is gained to the desired service by entry of a credit card number (or other authorization code, or by a combination of access and authorization codes) from the telephone at which the feature or service is desired to be used. If the telephone system is able to verify that the entered number, or code, is valid, then the service or feature is made available for use.

Unfortunately, this ease of access lends itself to fraudulent use of the credit card number or authorization code. Obviously, unless some other controls are imposed, an unscrupulous person who knows the number or code can access and use the service without charge. This works to the detriment of both the service provider (e.g., the long distance carrier) and the card holding subscriber. The service provider gains no revenue from the unauthorized use, may in fact become liable for such things as access charges, and potentially has its network congested with fraudulent traffic. The subscriber, on the other hand, faces a bill for services not obtained and the difficulties attendant to that.

The problem cannot be underestimated, and there is, in fact, a virtual "underground" industry which operates on this kind of fraudulent calling. The various ways that calling card and authorization numbers find their way into unscrupulous hands need not be discussed here, but suffice it to say that telephone "credit card fraud" and other forms of fraudulent use present pervasive problems for the telephone carriers, particularly the long distance carriers. Solutions continue to be sought.

One of the current methods of fraud control is to simply remove credit card numbers against which it is suspected that fraudulent calls are being charged (i.e., their use is blocked). In some cases, the subscriber's card may be taken out of service only if the subscriber cannot be reached for verification. In other cases, however, because of the high rate of fraud and the pattern of calling, control is imposed by a wholesale denial of calling privileges. It might be determined, for example, that fraudulent calls to certain geographic areas from certain calling numbers are so problematic that all calls meeting those criteria should be blocked. The criteria for blockage are varied, and the decisions for blockage might be based on such things as the originating switch, the call's originating information digits, or the class of service. This is a simple, but unsatisfactory, response to the fact that an inordinately high percentage of calls in certain cases (e.g., to certain countries) are fraudulently made.

With these methods there is a trade-off between customer service and fraud prevention. If monitoring is tightened and cards or authorization numbers are taken down aggressively, fraud is lowered, but revenue to the carrier is lessened, and innocent customers whose service has been affected by the sweeping denial are frustrated and angry at being unable to obtain full service. Thus, among other things, totally blocking high-risk countries reduces fraud but results in a less marketable product for the carrier.

The present invention therefore seeks to provide a method for controlling telephone charge card and other similar calling fraud so that there is less chance for unintended discrimination against authentic callers (i.e., those truly entitled), but by which there remains a high probability of denying the privilege to the inauthentic, or fraudulent, callers.

SUMMARY OF THE INVENTION

Briefly summarized, the foregoing and other objects are attained in a method wherein, for a given credit card number (or authorization number), an initial call which is placed against the number (or which, although not to be directly billed against the authorization number, nevertheless makes use of the authorization number), and which meets a certain primary criterion (or criteria), is intercepted and a determination is made as to whether the call is an authentic use of the number or not (i.e., whether the caller is truly an authorized, bona fide user). If it is determined that such an initial call is authentic, then calls subsequently made against that number are regarded as non-fraudulent and are allowed to be completed (even though they may meet the primary criterion), unless, or until, a secondary criterion (or criteria) is met. In the event the secondary, or follow up, criterion is met, then a call sought to be placed against the number will similarly be intercepted and a determination will be made as to whether the call is indeed authentic or not. If either the initial call, or any subsequent call meeting the follow up criterion, are determined to be inauthentic, the card or authorization number may be removed from service to avoid any further fraudulent use.

The result is either an initial authentication of the card number, with follow up control provisions, which gives the service provider greater assurance that only genuine customers are using the card number, or an invalidation of the card or authorization number in those certain events where it is initially being used fraudulently. Genuine customers have minimal chances of having their calls interfered with or their calling privileges inadvertently denied.

In one form of the invention the initial call intercept may be made as a function of the terminating location for the call. For example, an initial intercept may be made once a call is placed to any one of certain foreign countries. That is, an initial credit card call to a country which is known to receive a high percentage of fraudulent calls will be intercepted and directed to some means for determining whether or not the caller is authorized to make the call against the billing number. For this determination, the call may be directed to a human operator or to personnel specializing in fraud control who may validate or invalidate the card number based on certain authenticity testing procedures. These procedures may include such things as evaluating the caller's response to certain questions. If, for example, the caller is able to provide a correct name and address in response to an operator's query, the card will be initially validated as being used by an authorized caller, and it will be accepted for calls subsequently made (even to the certain countries). If there is an incorrect response or no response at all, however, the card number may be removed from service entirely.

If a call, or calls, made subsequent to the initial validation are determined to meet certain follow-up criteria, then a follow-up intercept will be made of a call meeting those criteria and a determination again made (also as by the caller's responses to certain inquiries) as to whether the card is sought to be used by an authorized party. If not, the immediate call will be denied and the credit card or authorization number will be taken out of service. The follow up criteria for call interception may be a pattern of calls generally recognized as being indicative of fraudulent calls. This might include such things as a pattern wherein there is a high rate of calls or of simultaneous calls against the same authorization code.

In one aspect, the invention is operative so that calls placed against a given authorization number or code can be triggered for interception at any time to establish the caller's valid or invalid use thereof depending on the need for more or less stringent control. That is, for example, a call can be triggered for interception at any time that the particular calling pattern of the follow-up criterion is entered.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

DESCRIPTION OF THE INVENTION

Figure 1:
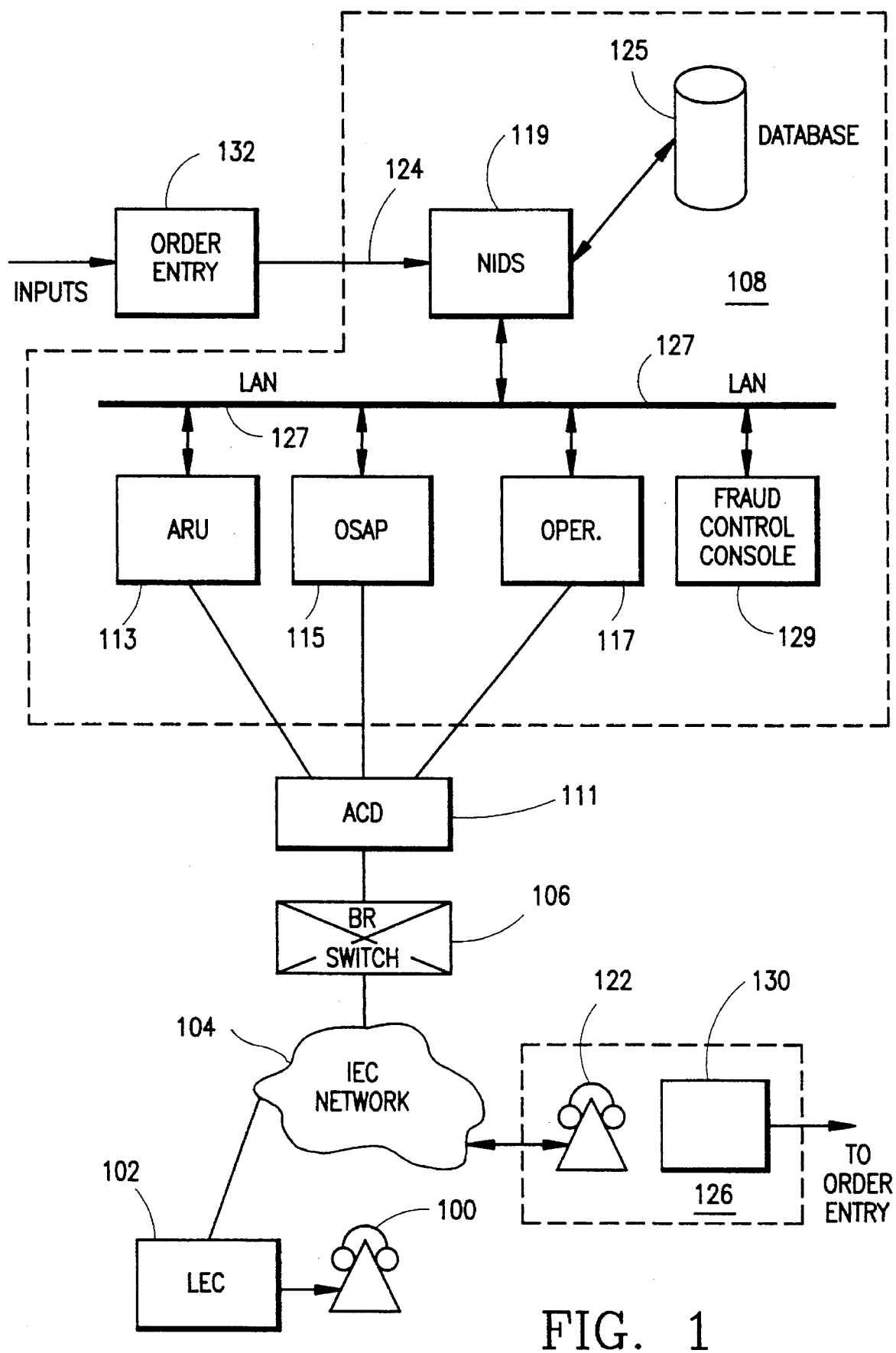
FIG. 1 illustrates, in block diagram format, a system environment for the invention as such a system might be configured for operation in connection with a long-distance telecommunications network.

An understanding of the invention can be arrived at by first considering the system of FIG. 1, along with a description of how a credit card call, for example, is thereby handled. FIGS. 2 and 3A–3E will be discussed in detail subsequently, but may also be referred to in connection with FIG. 1 for a full understanding of the invention.

In FIG. 1, it may be assumed that a caller using telephone 100 desires to place a long distance telephone call and to have the call billed to a certain credit card, or other billing account via an authorization number. The invention is operative to allow the call to be extended through the long distance network and to be completed only if there is some certainty that the caller is truly authorized to bill the call against the number or account sought to be used.

Typically, for a credit card call, the caller will enter (as from the keypad of telephone 100) a system access number which might, for example, be a 1-800 number (i.e., 1-800+ a 7-digit phone number). It will be recognized, however, that system access may be attained by alternative entries from the caller. In any case, the local telephone exchange operating company 102, which initially receives the call, recognizes the access number as a credit card call (or as some other special feature call) for handling by an interexchange carrier and passes the call through to the appropriate long distance network, such as to interexchange carrier network 104. Within network 104 the call is ultimately routed (by means which are well-known and which need not be discussed here) to a bridging switch 106.

The bridging switch 106 is a standard item of telecommunications equipment and may be located wherever it is convenient, but its purpose is to accept calls from the network 104 and to bridge them to an automatic call distributor (ACD) 111, and ultimately into an operator network center, such as operator network center 108. The bridging switch 106 and ACD 111 can also be considered as components of the network 104. Notably, there may be a number of geographically dispersed operator network centers to most efficiently handle calls from a wide area, but for purposes of developing an understanding of the invention, it will sufficient to focus here upon operator network center 108. It may be helpful to also note, however, that the intelligence and capability for routing to one operator network center or the other, as appropriate, will be provided in network 104 by well known techniques.

The operator network center 108 is comprised of audio response unit (ARU) 113, operator service application processor (OSAP) 115, at least one manual operator console 117, a network information distribution server (NIDS) 119, and a system database 125. The audio response unit 113, processor 115, server 119, and the operator console 117 are connected together by way of a local area network (LAN) 127 to provide for communications between these system components. The local area network 127 may, for example, be an Ethernet LAN, which is a well-known local area network system. Preferably, there is also a local fraud control console 129 connected to the LAN 127, although the functionality provided by the fraud control console 129 may alternatively be obtained outside the operator network center 108.

In such an alternative, for example, a remote fraud control station, such as fraud control station 126 (generally in lieu of the local console 129, although the two can be used in combination) may be accessed. Such access can be attained from the operator network center 108 and through the network 104. This occurs by completion of a call, via a business line or a dedicated access line (DAL) 123, to telephone 122 which is collocated with a second fraud control console 130. In such case, as will become clear from what follows, the remote fraud control console 130 also has indirect access to the system database 125 for updating the data contained therein with respect to a particular card, or account number.

To complete the architectural framework shown in FIG. 1, an order entry system 132 is connected into the operator network center 108 through the network information distribution server, NIDS 119. The order entry system 132 may be connected to the operator network center 108 by using token ring connectivity, as on line 124. The order entry system, per se, is not critical to the inventive concept and its function is to enter customer and other data into the system's operative databases to maintain on-going operations. Such order entry systems are well known and widely used in the business of telephony. In the context of the present invention, the order entry system 132 allows, among other things, the entry of data pertaining to a newly issued calling card (i.e., the credit card number, customer name and address, etc,). In the usual way, the order entry system 132 also accepts inputs from the remote fraud control console 130 to provide for the indirect access, mentioned above, that console 130 has for updating the database 125. The interconnect between console 130 and order entry 132 may, for example, be by direct access or by any means convenient. The order entry system 132 can be located wherever convenient for serving one or various coordinated operator network centers.

Operatively, the OSAP 115, which is a general purpose computer, functions as the central point for call routing control at the operator network center 108 and it exercises direct control over operation of the ACD 111. A computer suitable for providing the functions of the OSAP 115 is any one of the well known VAX model computers available from Digital Equipment Corporation. Similarly, the ACD 111 may be any one of a number of well known automatic call distributors or conventional switches adapted for the purposes of the invention. Here, the ACD 111 functions essentially as a queuing/queue selection switch. Those of skill in the art will recognize that it is entirely feasible, if queuing is not needed or desired, to provide a system essentially similar to that of FIG. 1 without using an ACD. Instead, in such event, the bridging switch 106 can be directed to route the call to the appropriate components within the operator network center 108. It may be desirable, however, to queue callers for a variety of reasons, including those cases wherein there is limited capacity or there is a need to queue callers so that they are responded to in an appropriately spoken language.

As illustrated, when a call, such as the credit card call under consideration, arrives at the ACD 111, the ACD makes a request to the OSAP 115 for directions as to how the call should be treated. The routing of a call at the ACD 111 is controlled from the OSAP 115 based on originating call information. That is, the originating call information determines what type of initial treatment the incoming call is to receive. The originating call information may include such things as the caller's number, given by automatic number identification (ANI), and the called number. In the case at hand, the OSAP 115, based on the access information (e.g., the 1-800 number), recognizes that the call is a special feature call (e.g., here, the caller wants to make a credit card call), and directs the ACD 111 as to which queue to place the call into for that purpose. The ACD 111 delivers the call to the appropriate queue and the OSAP 115 is informed that a call is ready on a specific port of the ACD 111. Call control is therefore managed outside the ACD 111, allowing changes and updates to be more readily made. In one view, calls are not driven by the ACD software, but by the programming of the computer of the OSAP 115. Given the criteria, the use of general purpose computers to control automatic call distributor functions in this manner will be recognized as an exercise that can be carried out by those of ordinary skill in the art.

Normally, although by no means exclusively, as will become clear, credit card calls such as those under consideration here will be queued by the ACD 111 for an appropriate port of the audio response unit 113. The ARU 113 is in two essential functional parts (although these are not separately shown in FIG. 1), comprising, first, a multi-port call flow processor, and second, a multi-port voice response unit. The call flow processor portion can be effectively implemented with a Model RS6000 RISC processor, which is commercially available from IBM Corporation. The voice response portion of the ARU 113 can be any of a number of the known automatic voice response systems for telephone use. For the present invention it has been determined that a voice response unit, based upon an IBM System 95 PC, available from Intervoice, Inc. of Dallas, Tex. will perform satisfactorily. In one ARU implementation contemplated to be useful for the invention, the ARU will be operative with 432 ports so that an equal number of calls can be handled simultaneously.

Operatively, the ARU 113 provides the application processing to move through the automated steps, including the provision of such things as voice prompting and menu routing, as needed. The call flow processing activates voice response functions such as (i) playing out digitized voice messages and tones; (ii) decoding inputs from the caller's telephone keypad (e.g., dual tone multifrequency, or DTMF tones); (iii) digitally recording voice inputs from a caller; and (iv) monitoring call progress. For the credit card call presently under consideration, the ARU 113 is programmed, for example, to automatically play out, at the appropriate times, after picking up the call from the ACD 111, requests for the caller's credit card number and for the telephone number being called.

In a sense, the operator console 117 operates somewhat in parallel with the ARU 113. Although the ARU 113 operates automatically to process calls routed to it by the ACD 111, the operator console 117 provides the capability to manually process certain calls which the ACD 111, under direction from the OSAP 115, routes to it rather than to the ARU 113. For instance, the caller in the example being considered might have accessed the system for an operator assisted credit card call rather than entering the 1-800 access number which generally will initiate automatic handling by the ARU 113. Such alternative access is usually attained by the caller dialing 0, either with or without additional digits (so-called 0+ or 0− dialing, respectively). In either event, whether the call is for operator assistance or not, the concern with fraudulent calls remains, and the invention is operative for both situations. It is also the case, and important to note, that in some aspects of carrying out or implementing the invention, certain calls, meeting certain criteria, will be intercepted from processing by the ARU 113, and diverted to the manual operator terminal 117. This will be more fully discussed hereinbelow.

The operator console 117 may be a personal computer (e.g., it may be an IBM personal computer or any of the various well-known functionally equivalent small computers) with an audio interface for interacting with the caller and with a LAN interface for interconnection to the LAN 127. In manual processing, for example, it may be the operator who prompts the caller to enter the credit card number rather than the ARU 113. Although not illustrated, it will be apparent that a number of operator consoles may be operated essentially simultaneously and in parallel on LAN 127. The operator who works a console, such as console 117, is presented (e.g., via a CRT screen) with menu selectable options at each decision point in the call flow. The flow control of manually handled calls matches the automated call processing in the ARU 113 so that a transfer from automatic to manual processing, or vice versa, can be recovered at the point at which one or the other ceases, with all of the information collected, up to the point of transfer.

All of the call flow processing in the console 117 and in ARU 113 operates on a data driven basis. Whether automated or manual, the same decisions are made while stepping through a call. Each decision is based on information stored in the system (or call control) database 125. Because the function flow is common, a call can be transferred between the two processing systems, ARU 113 and console 117, without losing the context of the call. The network information distribution server, NIDS 119, provides high speed access to the call control database 125. The NIDS 119, like the call processing portion of the ARU 113, may be an IBM RS6000 RISC computer.

In accordance with certain features of the invention, it will at times occur that a call being processed by either the ARU 113 or by the operator console 117 will be transferred to personnel especially trained to handle calls suspected of being fraudulently placed. It is the function of the fraud control console 129 to provide an operating platform and an interface into the operator center system for such personnel. The fraud control console 129 is similar to operator console 117 (that is, it may effectively be implemented with a personal computer having a voice interface and a LAN interface). It is, however, adapted to a broader range of operations and provides access to a complete range of data for a card number, including the calling history and calling patterns built up against a card. It also allows fraud analysis personnel a greater degree of flexibility in dealing with callers and in effecting changes to the databases for the purpose of fraud control. For example, a fraud control analyst at the fraud control console 129 will generally have some capability for making limited changes in the credit card records of the system database 125, whereas an operator at an operator station will have no such capability and will be more rigorously scripted in dealing with callers.

Although a local fraud control console, such as console 129, provides a great degree of flexibility by virtue of the direct LAN connection (e.g., there is the same ability to transfer call processing as discussed above for the ARU and the operator console), the remote fraud control station 126 may be conveniently and economically accessed as an alternative. This is achieved by placing a call from the operator network center 108 via the network 104 to the fraud control site 126 through either switched or dedicated egress. With this alternative, when a call is transferred from the operator console 117 or the ARU 113 to remote station 126 there is a release of the call from the operator network center 108 and a placement back into the network 104 for routing to the remote station 126. A fraud control specialist at the console 130 is then put in direct contact with the caller via telephone 122.

Whereas the local fraud control console 129 has substantially direct access to the system database 125 via LAN 127 and server 119, the remote console 130 can most readily be given access to database 125 (in most network systems) indirectly via the order entry system 132. Changes in the account records in database 125 for a particular credit card, for example, will be made from fraud control console 130 by requesting that such changes be entered through order entry system 132.

Figure 2:
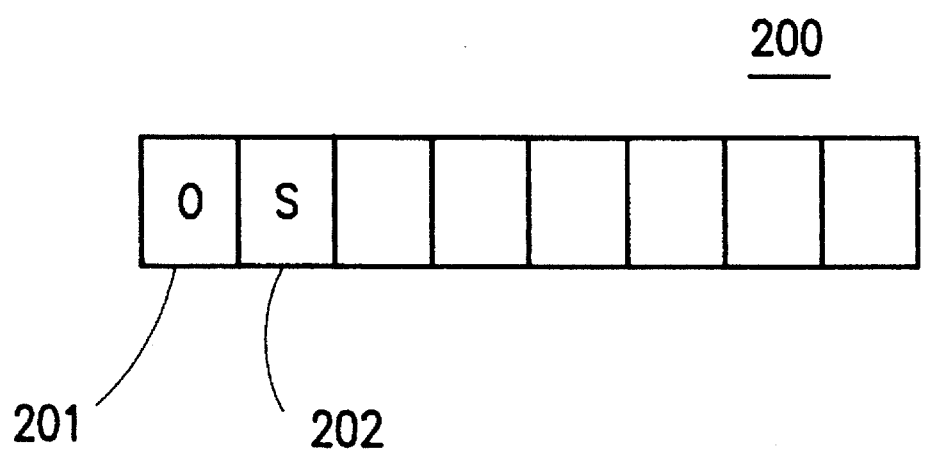
FIG. 2 is a drawing showing one form of an account control message as might be used in the invention.

A credit card number contained in the system database 125 (such numbers are initially entered through the order entry system 132) has associated with it an account control message which is also stored in the database 125. The account control message, interrogated by ARU 113 for each use sought of the associated credit card, contains a set of control flags whose settings are used to determine the disposition of a call made for billing against the card. FIG. 2 shows a typical account control message 200 comprising an eight bit digital word in which the first and second bits, 201 and 202, provide override and suspect flags, respectively, the use of which will be discussed further hereinbelow. These flags are set or reset by causing the bit to assume either a "one" or "zero" value as required. In the example at hand, at some point, for the caller at telephone 100, the account control message associated with the furnished credit card number will be examined to interrogate the control flags for call control purposes.

Operation of the system of FIG. 1 is detailed in the flow charts of FIGS. 3A–3E wherein for illustration purposes, calls are to be placed using a credit card authorization number.

Figure 3A:
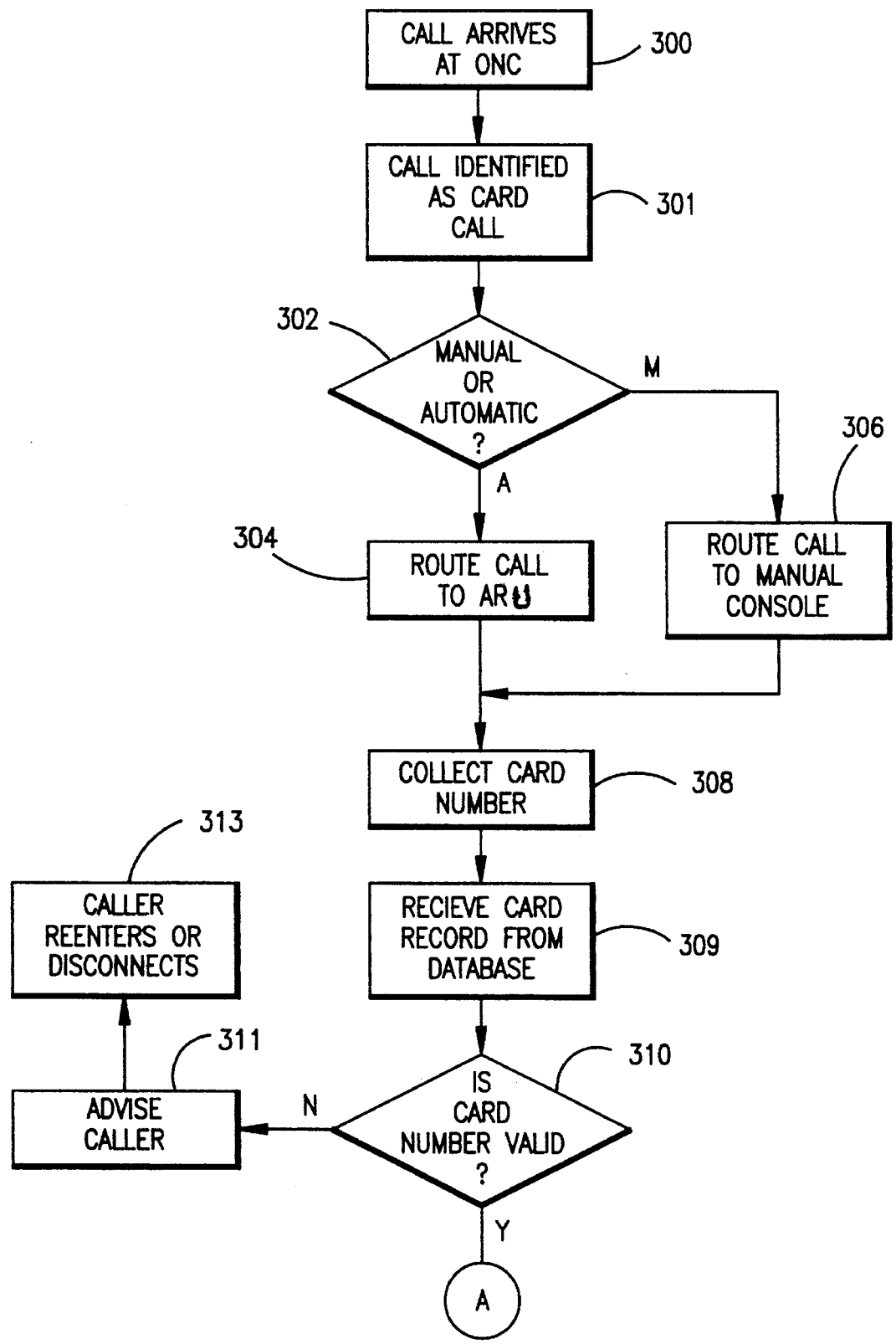
FIGS. 3A–3E taken together form a flow chart illustrating operative steps of a method in accordance with the invention for controlling fraudulent telephone calls and may be considered in connection with FIGS. 1 and 2.
Figure 3B:
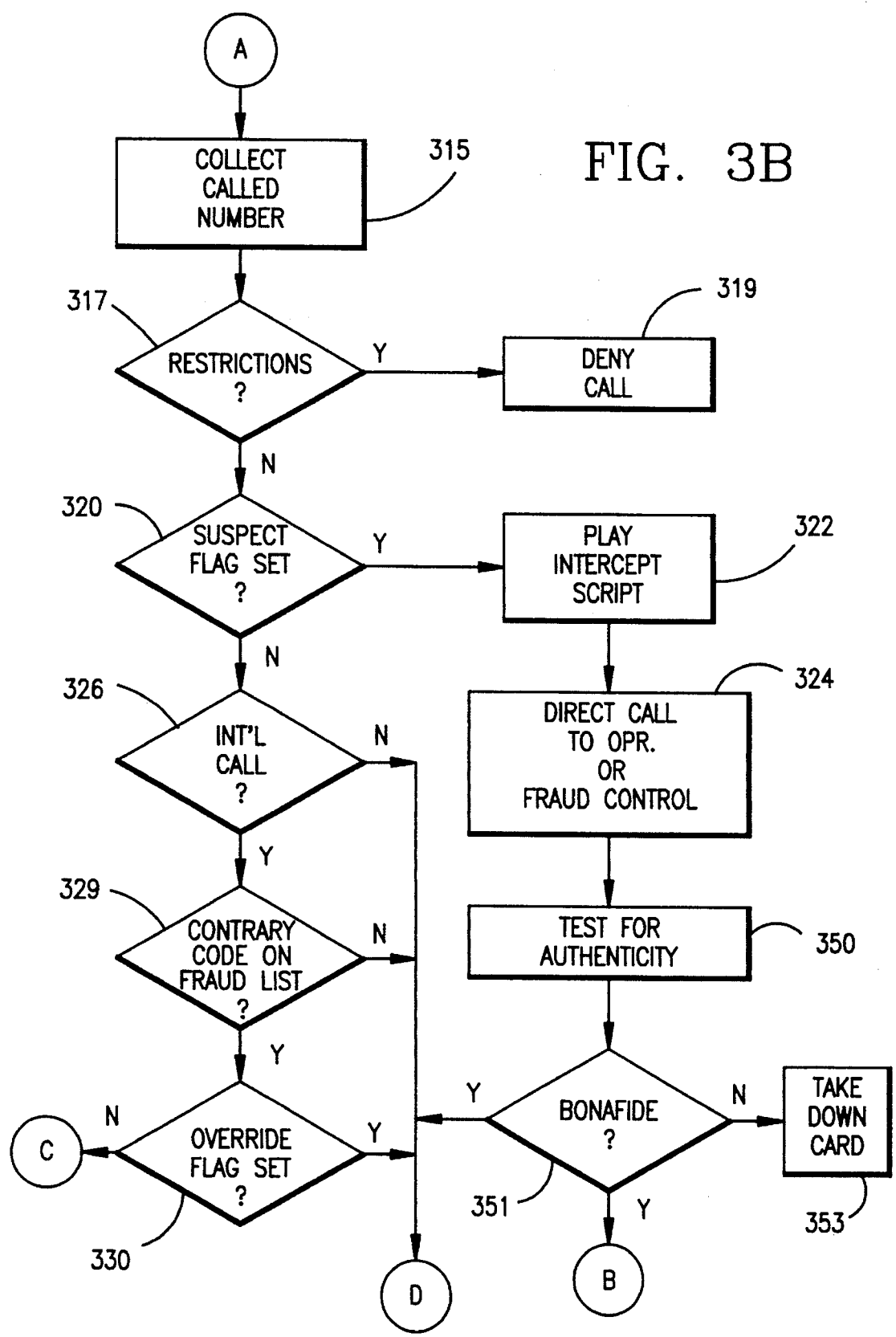

In FIG. 3A (and with reference to FIG. 1), at step 300 a credit card call, such as, for example, the call under consideration from telephone 100, arrives at the operator network center 108, having been appropriately routed to that point by the network 104. Since the operator network center 108 may be the recipient of calls for purposes other than credit card calls, it will first be determined from the parameters of the call (e.g., the dialed access number) in step 301 that the call is a credit card call. Although not illustrated as a separate processing step, it will be understood that this causes the caller to be automatically prompted with an appropriate set of tones or instructions as is typical for a credit card call.

Further, based on the parameters of the call, in step 302 it is determined whether the call should be initially handled automatically or manually. These determinations are made by the OSAP 115 with reference to information available from the data base server 119.

Under direction of the OSAP 115, the ACD 111 then routes the call, either via step 304 for automatic handling to an appropriate port of the ARU 113, or via step 306 for manual handling to operator console 117. In most cases, such as where the caller accesses the system by use of a 1-800 access number, the call will be handled automatically. The invention is operative in either mode, however, and as has been pointed out above, the call processing may be transferred from one mode to the other without loss of call flow or context. FIGS. 3A–3E reflect this commonality subsequent to steps 304 and 306, although the following discussion is mostly in terms of call handling by the ARU 113.

In the following step 308, for example, the ARU 113 operates to collect the credit card number from the caller. For this purpose the ARU 113 issues prerecorded voice prompts to direct the caller (say, at telephone 100) to enter the credit card number against which the call is sought to be billed. Currently, in most cases the card number will be entered from the telephone's keypad to provide DTMF tones as is well known. On the other hand, it is within the scope of the invention that the number may be merely spoken for voice recognition of the number by the ARU 113.

In any case, in step 309 the card record for the particular card number which has been supplied is retrieved from the database 125 for use in processing the call by the ARU 113. Next, in step 310, a check is made as to whether the card number is valid. This initial check 310 is simply to determine if the card number has been issued and is recognized as one that is in service. For this purpose, the ARU 113 accesses NIDS 119 and database 125 and checks the data therein to see if the card number can be accepted (e.g., it cannot be accepted here if the number is not resident in the database). If not accepted, then step 311 is entered whereby an announcement is played to the caller advising that the card number is not recognized or that it cannot be accepted for the particular call. The caller, by step 313, may then reenter an alternate number or disconnect.

If the card number is one that is in service, then processing proceeds to step 315 (FIG. 3B) whereby the caller is prompted to enter the telephone number being called. If the call is to an international destination, the entered number may include the country code and local area number within the country. The number may be entered in the same way as was the credit card number, discussed above.

After collecting the called number digits in step 315, a check is made in step 317 to determine from the card's account record if there are any limitations generally placed on the use of the card number. This is a step in card processing to control the universe of use for the card number. For example, from the originating information digits that arrive with the call it can be determined whether the call is from a pay phone, a cellular phone, or from a restricted use location such as a prison. It may be required to deny placement of credit calls or all calls from one or more of these originating stations to certain destinations. If restrictions apply, then step 319 is operative to deny the calling privilege and the caller is advised accordingly (although this latter aspect is not specifically illustrated).

If the card number is one that is in service, and if the use sought is not otherwise restricted (step 317), then for step 320 the ARU 113 accesses the system database 125, obtains the account control message stored therein for the particular credit card number, and interrogates the message to determine the status of the suspect flag. The opportunities for setting and resetting the suspect flag will become apparent from the following discussion, but for now it may be noted that the status of the suspect flag determines the subsequent processing that is accorded the call. Basically, if the suspect flag is set, that is reflective of the fact that certain secondary intercept criteria are met, and the call will be intercepted and routed for special handling. When intercepted at this point, processing proceeds to steps 322 and 324 which will be discussed below.

Figure 3C:
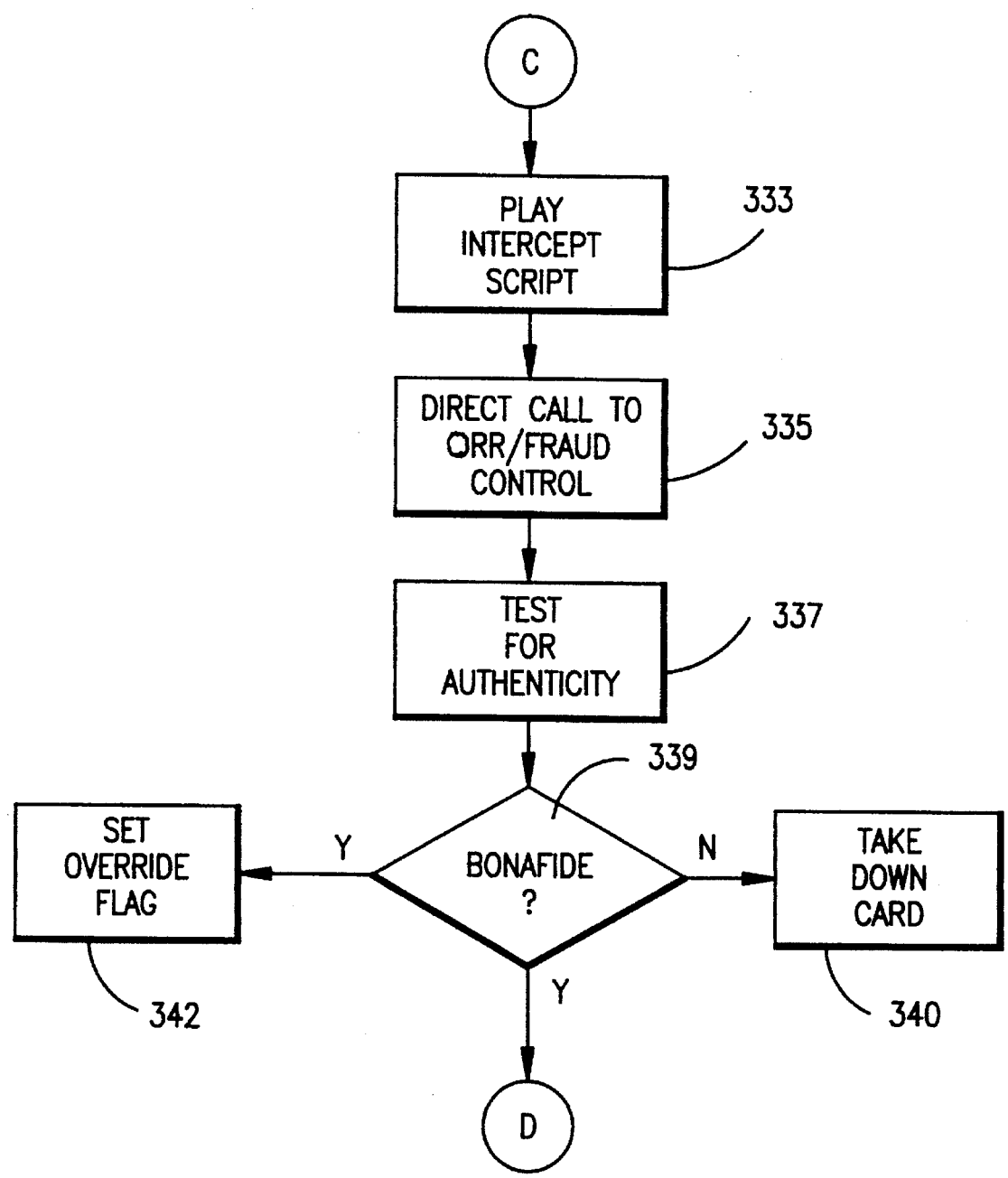
Figure 3D:
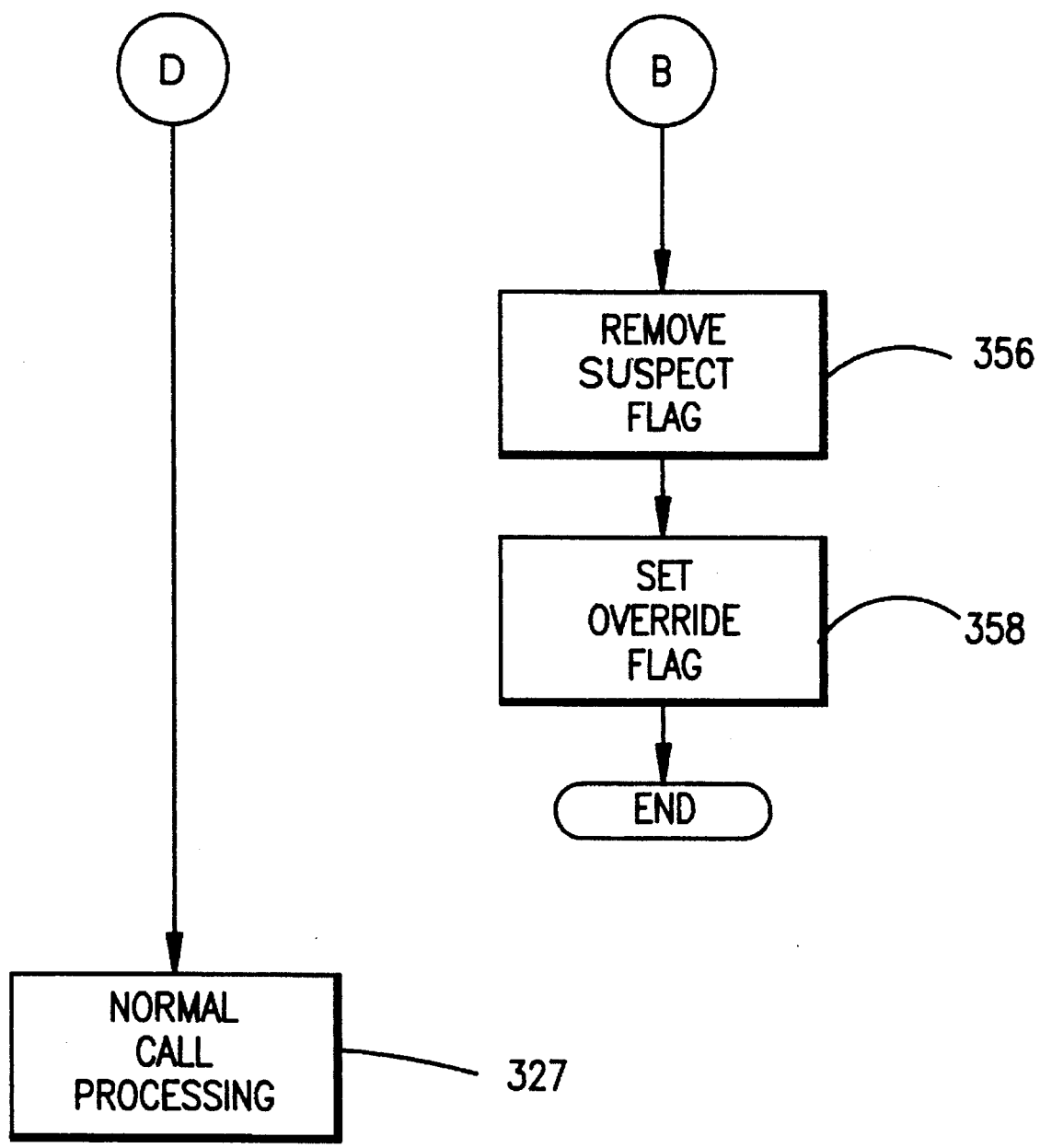

If the suspect flag is not set, then processing proceeds to step 326, whereby, from the called number, the ARU 113 determines if the call is an international call or not. If it is not, then the call is accorded normal call processing at step 327 (FIG. 3D). Normal call processing merely means that the ARU 113 releases the call back to the network 104 for completion in a normal, uninterrupted manner.

If it turns out that the call is an international call, however, then step 329 is entered and a check is made (generally from the parts of the called number known as the country and city codes) to see if the call is to a country and local area therein that is of concern because it is the target for a high percentage of fraudulent calls. If the destination location is not on the fraud list, then the call is also passed to normal call processing at step 327.

If the call is placed to a high fraud country (or, more pointedly perhaps, to some locality of a country), then the override flag of the account control message is checked in step 330 to see if it is set or not. How this flag becomes set or reset will also become clear from what follows. If it is set, that is a signal that the call in progress will receive normal call processing, and the call flow is advanced to normal call processing step 327. Notably, if the call is not "suspect" (i.e., the suspect flag is not set) and if the override flag is set, the call will be allowed to be completed even if the call is to a high fraud country.

For the first time through the process, it is likely that neither the suspect flag nor the override flag will be set. Although these flags may each be set in advance when the card is issued (and generally at any time), there is then no operating experience as a basis for doing that. Thus, the processing for an initial credit call to a high fraud country will reach step 330, and since the override flag is not set, processing will be passed to steps 333 and 335 (FIG. 3C). That is, steps 326 and 329, whereby the call is checked for its destination, represents a primary criterion for intercepting a certain call meeting the criterion.

By operation of step 335 the call is intercepted and diverted to manual console 117 from which an operator picks up the processing and is brought into contact with the caller. Alternatively, the call flow processing can cause the call to be diverted directly to a fraud specialist at console 129 if desired. Prior to response by the operator or fraud specialist, however, the system may play an intercept script at step 333 to let the caller know what is about to happen. A typical script may say, for example, "Please hold while your call is being transferred to an MCI operator. To protect you from unauthorized use of your calling card . . . ", etc.

The console 117 (or console 129) receives the call, where it is identified as a transfer, and information on the call (e.g., the card number, called number, originating number, and other caller information) is retrieved for access by the operator. Preferably the console 117 presents the operator with scripting to follow for interacting with the caller and with color keys to provide yes/no inputs to the console to cause advancement of the process. Once the operator (or fraud control analyst) picks up the call the objective is to determine whether or not the call is an authentic use of the calling card or billing code. The test for authenticity is shown as step 337 in FIG. 3C. One way that authenticity can be tested is to ask the caller to give information which only authorized users would be expected to know. The caller may be asked to supply the billing name and address associated with the card, for example. In any event, the operator has the prescribed response available (e.g., on a display screen) and by comparing the known information with the caller's response a test is made (step 337) as to whether the use is authentic. It will be apparent that the test for authenticity can be made in any number of ways, including, for example, by comparing the caller's voice with a prestored representation of authorized callers' voices.

If it is determined from the caller's responses that the call is not a bona fide use of the credit card or billing code, then by the decisional operation of step 339, based on the operator's keyed inputs, for example, processing is moved to step 340 whereby the immediate call is denied and the card is caused to be removed from service (i.e., the card is "taken down"). A card is taken down in the same sense that a card would normally be cancelled from use upon termination of card services to a subscriber, except that by the present invention the card number is removed from service with sufficient immediacy to block any subsequently attempted calls. A card is removed from service, for example, by changing the record for the card in database 125 to, in effect, delete the card number therefrom. For present considerations the effect is that the card number will no longer be accepted for any purpose. It will not be validated, for example, at step 310 of the process.

If, on the other hand, at step 339 the call is found to be a bona fide use of the credit card or billing code (i.e., the operator or fraud specialist determines the caller is authorized), then the operator's approval response causes step 342 to become operational whereby the override flag of the account control message is set. The particular call in progress is also allowed to be completed per normal call processing step 327. For so long as the override flag thereafter remains set and the suspect flag remains unset, calls placed against the calling card will be allowed even if the calls are to high fraud locations.

It will now be recognized that the suspect flag will be checked for every call (step 320), including domestic calls, placed against an authorization number and that the override flag will be checked for non-suspect calls (step 330) directed to locations known to be the target for a high rate of fraudulent calls. Detection of a set suspect flag in step 320 is taken as preliminary indication that the associated card number is being misused (i.e., that the call is "suspect") and that a call placed against it should therefore be intercepted to conduct an assessment of the caller's authority to use the number.

For this purpose, a suspect flag detected at step 320 causes step 324 to be entered whereby the call is intercepted and directed to operator console 117 (or, as pointed out above, to fraud control console 129). From the caller's perspective, step 322 precedes step 324 and causes an intercept script to be played to the caller in the manner described above for step 333.

Once the operator or fraud analyst is in contact with the caller a test for authenticity of the intercepted call is made in step 350 in a manner similar to that described above for the test of step 337. Since, as a result of the suspect flag being set, the call is prima facie suspect, the test for authenticity may be more rigorous and in-depth. The console 117, for example, identifies the call as a transfer and presents the operator with such entered information as the card number, the called and originating numbers, and pertinent customer information. Since the suspect flag is set, the console 117 also identifies the call for the operator as a "suspect" call, and presents scripting to direct the operator in handling the call. The console 117 is also adapted to accept "yes/no" inputs from the operator (as from a keyboard) which may be entered as a result of caller responses. During the course of the test 350, the call may be transferred from an operator at console 117 to a fraud control specialist at console 129 (or if a local fraud control analyst is unavailable, then to remote fraud control site 126). Generally, such a transfer will be made to improve the chances for discriminating against fraudulent calls since a fraud analyst may be especially trained for such purpose and will have more flexibility in dealing with a caller than does an operator. A transfer is not shown by separate steps in the drawing figures since the transfer and follow-up testing by a fraud analyst may be considered part of steps 324 and 350. The transfer may be effected by the operator who is the initial contact with the caller in these situations.

If, as a result of the test for authenticity of the intercepted call, the call is found by decisional step 351 not to be a bona fide use of the calling card, then the operator or fraud analyst will provide an appropriate input to their console so that processing is passed to step 353 whereby the call is denied and the card is taken down. On the other hand, if, despite the fact that the suspect flag was found to be set for the card, the use is determined by the authenticity testing steps 350 and 351 to be bona fide, then the call is allowed to be passed to normal call processing step 327.

Furthermore, as a result of the authenticity testing made on the intercepted call in steps 350 and 351, a reasonably high level of confidence may be established that the card or authorization number is not being fraudulently used despite the preliminary indication given by the suspect flag. When that is the case the suspect flag for the card's account control message can be reset to avoid unnecessarily intercepting subsequently made calls. Thus in step 356 the suspect flag is removed and in step 358 the override flag is set (FIG. 3D). These latter two operations are most effectively carried out by a fraud analyst at console 129 whereby access is gained to make changes in the stored account control message. It will be recognized, of course, that the suspect flag may be removed without setting the override flag. This will result in an intercept of any subsequent call to a high fraud country and an opportunity to reverify use of the card.

The setting and resetting of the call control flags as occurs at certain steps in the process are carried out most effectively by fraud specialists located at either the local fraud control console 129 or, alternatively, at the remote fraud control console 130. Resetting the call control flags is an operation generally not under control of an operator handling the call.

In sum, operation is such that an initial call sought to be placed to a high fraud country and charged to a credit card will be intercepted since neither the suspect flag nor the override flag in the call control message will be set. This first interception is used to test for authenticity of the call (i.e., is the caller authorized to use the number) and to set the override flag accordingly. Subsequent calls are intercepted and handled on a call-by-call basis if the suspect flag is set. If the suspect flag is not set, but the override flag is, then calls are allowed to be placed without interception even if they are to high fraud countries.

Figure 3E:
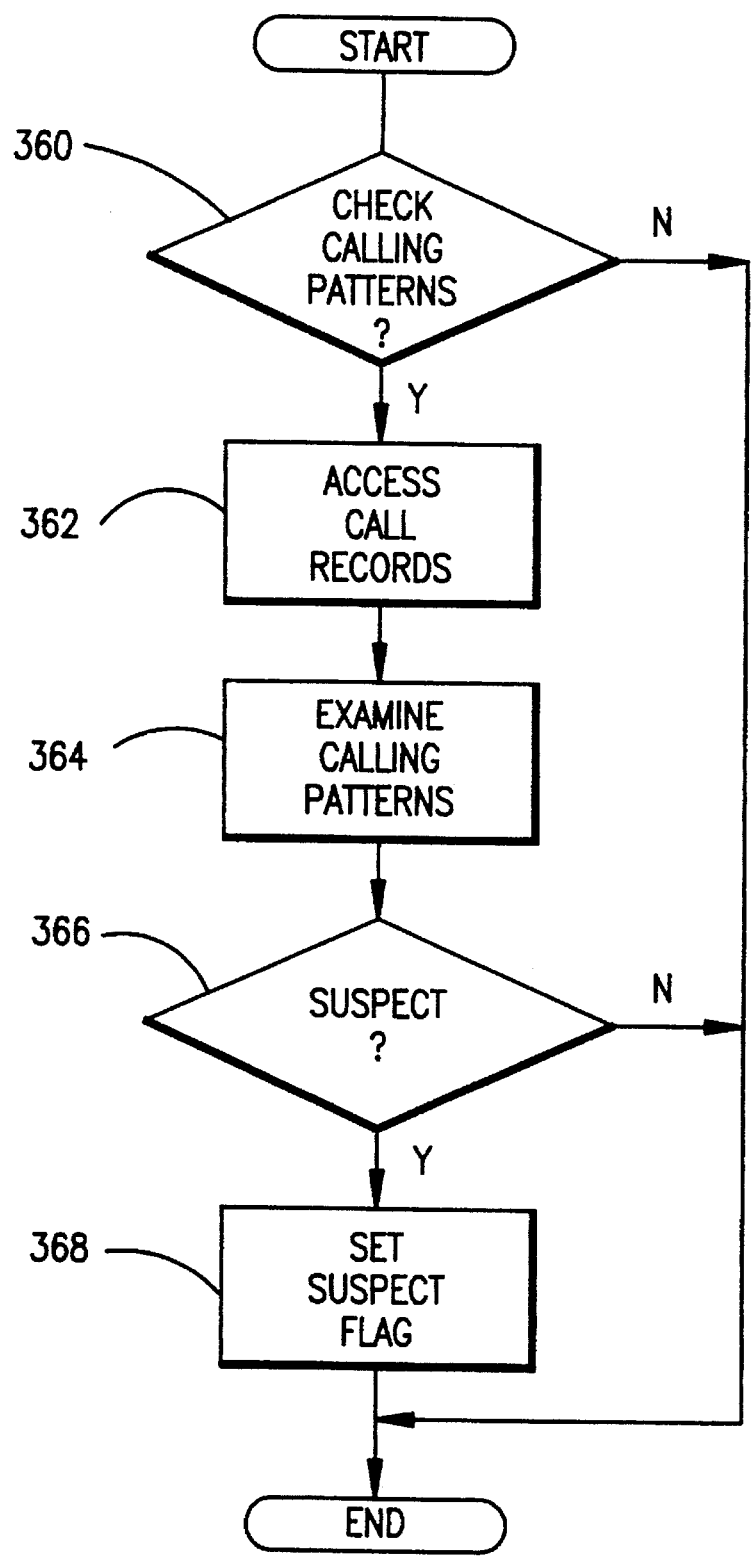

Despite the fact that the override flag may become set, allowing calls to be placed without interception and giving the carrier some assurance that each call is authorized, it has to be recognized that a calling card or authorization number can become misused at any time. The flexibility of the invention, permitting the call control flags to easily be changed, provides a way to deal with this. FIG. 3E illustrates process steps whereby the suspect flag becomes set for an account control message.

For this purpose, the fraud analysis consoles, preferably console 129, but also fraud control console 130, are adapted to allow access, at virtually any time, to the calling record contained in the system data base 125 for any particular calling card. If a fraud analyst at the appropriate console discerns from the record that there is a calling pattern indicative of fraud for a particular card, then in accordance with the steps of FIG. 3E the suspect flag can be set to cause the next placed call to be intercepted (step 320, FIG. 3B). There is thus established a certain secondary (or "follow up") criterion for causing a call to be intercepted. The fraud control analyst might, for example, discover from the call record for a card that there are patterns of repeated calls of long duration to a high fraud country and at an excessive rate of calls per unit time, or that multiple calls are being placed simultaneously against a card number. These patterns could be taken as evidence that the card is being fraudulently used and as a criterion that control action should be taken. This avoids taking down a card arbitrarily and gains rapid contact with the caller to determine whether the use is legitimate.

Thus initially, in step 360, a decision is made, based on some preselected statistical threshold as discussed above, as to whether to check the calling patterns for a particular card.

How a particular card is targeted for pattern inspection need not be described in detail here since it will be recognized that calling statistics can be obtained from normal call processing and that thresholds can be set whereby the statistical information will call attention to the use being given to a particular card number. Once a card number is targeted, the call record for the card is accessed (step 362) and an examination is made (step 364) of the calling patterns. Based on the call record and the pattern discerned, a decision is made in step 366 as to whether to impose a suspect flag or not. If warranted, step 368 is operative whereby the suspect flag in the account control message is set.

While the foregoing has described an embodiment of the invention wherein the initial intercept of a call occurs because the call is to a high fraud rate country (for example, steps 329 and 330 of FIG. 3B), it is obvious, and within the scope of the invention, to employ criteria other than those specifically described for causing either an initial or a follow up intercept of a call. It may be desirable, for instance, to cause an intercept of credit card calls originating from certain local exchange areas or from pay phones, or to combine originating call information with termination information to cause the intercept. It will also be clear that the account control message and the configuration of the flags may be modified from those described herein without departure from the inventive concept.

Additionally, as has been noted above, the invention may also be used in other environments and for other applications besides credit card control. For example, it is useful to control fraudulent use of those calling features which allow remote access to virtual telephone network products. For these products, a caller gains access to a telephone calling system by an access number. The access number is generally the number billed against, and authorized use, after access, is obtained by entry of a personal identification number which serves as an authorization number. In those cases the method controls calls sought to be billed against an account code via use of an authorization code. That is, it is a feature of one form of the invention that the authorization number which may result in a call intercept need not be the same as the account code against which the call is billed.

Furthermore, although the invention has been described in a form useful for controlling fraudulent billing of long distance telephone calls, it will also be recognized that the invention can be used as well for controlling fraudulent use of other special calling features accessed by the entry and recognition of an authorization number or code. It will, in fact, be understood that various modifications may be made to the forms of the invention herein described. It will also be recognized that the functionality of the invention may be achieved with various combinations of hardware and software. It is intended to claim all such modifications and variations which fall within the true spirit and scope of the invention.

What is claimed is:

1. A method for controlling telephone calls sought to be fraudulently billed by unauthorized use of an authorization code, comprising the steps of:

(a) establishing a primary criterion for intercepting a call sought to be placed by use of the authorization code;

(b) establishing a secondary criterion for intercepting other calls sought to be placed by use of the authorization code;

(c) intercepting an initial call placed against the authorization code and meeting the primary criterion;

(d) determining if the intercepted call is an authentic use of the authorization code by an authorized calling party;

(e) if the intercepted call is an authentic use, then permitting future calls to be placed against the authorization code without interception until such time as said secondary criterion may become met by such another call.

2. The method of claim 1 including the further step of:

(f) if the call intercepted in step (c) is not an authentic use, then causing the authorization code to be removed from service.

3. The method of claim 2 including the further steps of:

(g) determining if a call intercepted in step (e) is an authentic use of the authorization code; and (h) if the call so intercepted is not an authentic use, then causing the authorization code to be removed from service.

4. The method of claim 3 wherein the primary criterion established in step (a) is the placement of a call for termination at a preselected location.

5. The method of claim 4 wherein the secondary criterion is a pattern of calls placed against the authorization code, said pattern having characteristics indicative of fraudulent calls.

6. The method of claim 5 wherein authentic use is determined in step (d) by said calling party's response to at least one inquiry, the correct response to which is accepted as indicative of authentic use.

7. The method of claim 3 wherein the determination of authentic use in step (d) is carried out by a telephone operator and the determination of authentic use in step (g) is carried out by a fraud control specialist.

8. The method of claim 6 wherein the preselected location is a foreign country.

9. The method of claim 7 wherein said at least one inquiry includes a request for an authorized caller's name and address.

10. The method of claim 3 wherein the primary criterion established in step (a) is the placement of a call from a certain originating geographical area for termination in another geographical area.

11. A method for controlling telephone calls of the kind attempted to be made fraudulently against an authorization number, comprising the steps of:

(a) determining certain geographical areas to which fraudulently placed calls are of concern;

(b) determining a pattern of characteristics indicative of calls being placed fraudulently;

(c) intercepting a call placed against the authorization number for termination within any one of said areas;

(d) determining whether the intercepted call is or is not authorized to be placed against the authorization number;

(e) if authorized, then allowing completion without interception of calls subsequently made against the authorization number until such time as such calls fall into the pattern determined by step (b) whereupon a subsequent call will be intercepted; and (f) if not authorized, then removing the authorization number from service to prevent future calls from being placed against it.

12. The method of claim 11 including the further step of:

(g) for a call intercepted in step (e), determining whether said call is or is not authorized to be placed against the authorization number and if not, then causing the authorization number to be removed from service.

13. The method of claim 12 wherein the determination of step (d) is based on responses by a caller placing the call intercepted in step (c) to inquiries by a telephone operator; and the determination of step (g) is based on responses by a caller placing the call intercepted in step (e) to inquiries by a fraud control specialist.

14. A method for controlling telephone credit card fraud, comprising the steps of:

(a) intercepting an initial call sought to be billed to a credit card number and placed to a foreign country which is known to be the terminating location for a significant level of fraudulent calls;

(b) determining if the initial intercepted call is a bona fide use of the credit card number;

(c) if the initial intercepted call is a bona fide use of the credit card number then setting an override flag to permit subsequent calls placed against the credit card number to be completed without interception despite being placed to said foreign country;

(d) setting a suspect flag to cause interception of at least one of said subsequent calls placed against the credit card whenever there is a pattern of calls placed against the credit card number, which pattern is indicative of fraudulent calls;

(e) upon interception of said call for which the suspect flag is set, determining whether the call is a bona fide use of the credit card number;

(f) if the call intercepted in step (e) is not a bona fide use, then removing the credit card number from service.

15. The method of claim 14 wherein the override flag and the suspect flags are contained in an account control message.

16. A method for controlling telephone calls sought to be fraudulently billed against an account by use of an authorization code, comprising the steps of:

(a) establishing a first criterion for causing an intercept of a call which is sought to be billed against said account by use of said authorization code;

(b) establishing a follow-up criterion for causing an intercept of another call which is sought to be billed against said account by use of said authorization code;

(c) intercepting a call placed for billing against said account by use of said authorization code when said first criterion is met;

(d) determining if the intercepted call is an authentic use of the authorization code by an authorized user;

(e) if the intercepted call is an authentic use, then permitting future calls to be placed against said account by use of said authorization code until such time as said follow-up criterion is met.

17. The method of claim 16 including the further step of:

(f) if the intercepted call is not an authentic use, then causing the authorization code to be invalidated so that future calls sought to be placed by a use thereof will be denied.

18. A method for controlling telephone fraud of the type wherein telephone calls are sought to be placed by wrongful use of an authorization code, comprising the steps of:

(a) establishing a first intercept criterion and a second intercept criterion, each for causing an intercept of calls sought to be placed against the authorization code;

(b) intercepting an initial call placed against the authorization code and meeting the first intercept criterion;

(c) determining whether the intercepted call is an authentic use of the authorization code or not;

(d) if not authentic, then removing the authorization code from service;

(e) if authentic, then allowing subsequent calls to be placed against the authorization code for so long as said second intercept criterion is not met and notwithstanding that any of said subsequent calls may meet said first intercept criterion.

19. The method of claim 18 including the further steps of:

(g) intercepting a call placed against the authorization code subsequent to the interception of said initial call and meeting said second intercept criterion;

(h) determining whether the call intercepted in step (g) is an authentic use of the authorization code or not; and (i) if not authentic, then removing the authorization code from service.

20. The method of claim 19 wherein the first intercept criterion includes the placement of a call to a preselected location.

21. The method of claim 20 wherein the first intercept criterion further includes the placement of said call from a pay telephone.

22. The method of claim 20 wherein the second intercept criterion includes a pattern of calls sought to be placed against the authorization code, which pattern is indicative of fraudulent calls.

23. A method for controlling telephone fraud of the type whereby calls are fraudulently placed by unauthorized use of an authorization code, comprising the steps of:

(a) establishing a first intercept criterion for causing an intercept of at least an initial call which uses the authorization code and which meets said first intercept criterion;

(b) establishing a second intercept criterion for causing an intercept of any call which uses the authorization number and which meets said second criterion, said second criterion being a preselected calling pattern indicative of fraudulent calls:

(c) upon interception of a call meeting the second criterion, determining if that call is an authentic use of the authorization number and if not authentic, then removing the authorization number from service;

(d) upon interception of a call meeting the first criterion, determining if that call is an authentic use of the authorization number;

(e) if not authentic, removing the authorization number from service; and (f) if authentic, allowing subsequent calls to be completed without interception notwithstanding that they meet the first criterion.

* * * * *